Dec. 7, 1937. D. S. MUZZEY, JR 2,101,408
SEISMIC SURVEYING METHOD
Filed Nov. 6, 1935 2 Sheets-Sheet 1
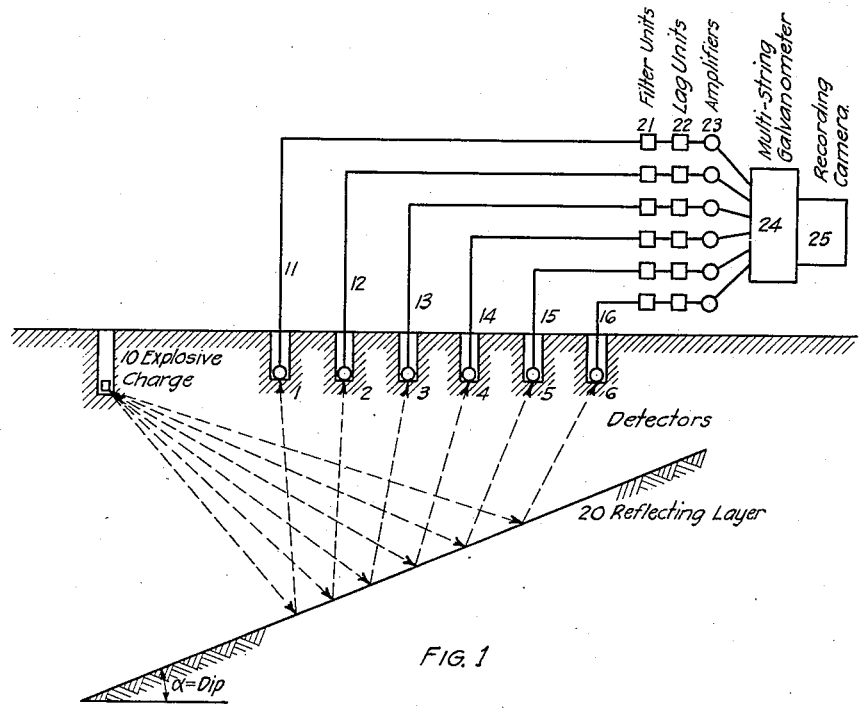
FIG. 1
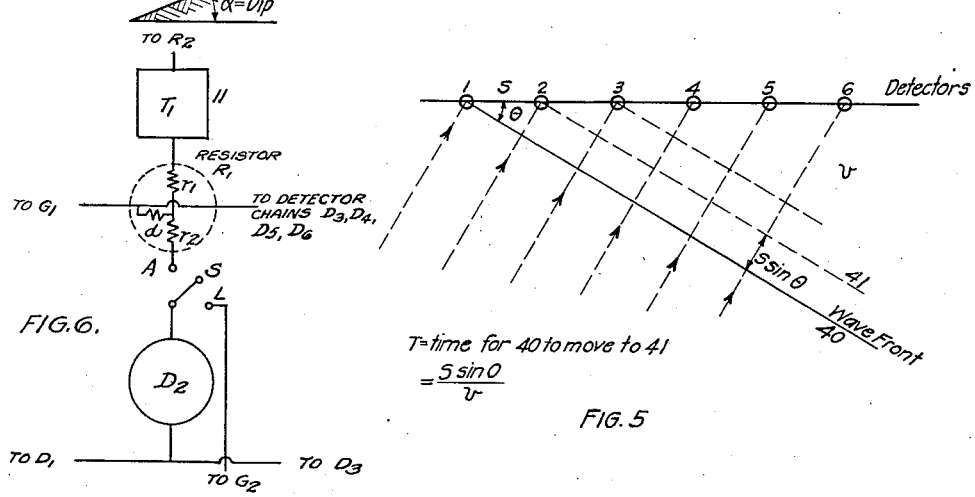
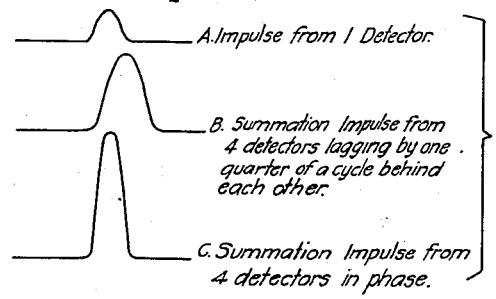
Inventor: David Saville Muzzey Jr.
By his Attorney: H. Birch Inventor: David Saville Muzzey Jr.
By his Attorney:

Patented Dec. 7, 1937

2,101,408

UNITED STATES PATENT OFFICE 2,101,408

SEISMIC SURVEYING METHOD

David Saville Muzzey, Jr., Houston, Tex., assignor to Shell Development Company, San Francisco, Calif., a corporation of Delaware Application November 6, 1935, Serial No. 48,510

9 Claims. (Cl. 181—0.5)

This invention pertains to the art of seismology in its application to geological problems, and refers more particularly to a method of utilizing artificially generated elastic waves in the crust of the earth to map the structure of subterranean strata and to determine the dip of such strata.

Geophysical methods, such for example, as the seismic method, have been widely applied during recent years to survey tectonic formations and to obtain indications as to the location of valuable deposits without the necessity of drilling expensive test holes. The seismic method utilizes the elasticity of the earth, that is, its ability to propagate elastic waves generated by a disturbance, such for example, as the detonation of an explosive charge at or near the surface of the ground.

Some seismic methods are concerned with the measurement of the time interval between the moment of generation of the disturbance in the ground and the moment of arrival of this disturbance at one or more detecting instruments, such as seismographs or seismometers, located at predetermined distances from the point at which the disturbance is generated, herein called the shot point. Other seismic methods are concerned with the measurement of the time intervals between the arrival of the disturbance at the different detectors spaced in a predetermined manner. The ground disturbance is usually converted by the detectors into an electrical current which may be, if desired, photographically recorded on a seismogram by means of instruments such as string galvanometers or oscillographs.

The elastic waves constituting a ground disturbance are propagated in all directions from the point of origin along a continuous wave front. Waves that have traveled over a great distance from the source as, for instance, down to a deep reflecting layer and back, will have sensibly plane wave fronts, or instead of considering the wave front, it may be stated that the disturbance travels in all directions along rays which are normal to the wave front and which may for practical purposes, be taken as straight lines as long as the disturbance travels in a homogeneous layer.

The surface of the earth, however, is not a homogeneous medium, since it consists of strata having different densities and elasticities. A disturbance generated by an explosion, after traveling in straight lines in all directions through a homogeneous layer, such for example, as a soft shale layer, may reach an underlying hard limestone layer, whose velocity of propagation of such disturbances is sometimes over ten times greater than that of the shale layer. The difference in velocities of propagation of the two materials causes the phenomena of refraction and reflection at the interface of the two layers. A part of the wave's energy generates a refracted wave in the second layer, which travels therethrough at a different speed and at an angle to its original direction in the first layer, while another part of the wave's energy is reflected at an angle equal to the angle of incidence, giving rise to a reflected wave in the first layer.

Seismic surveying methods may be divided into refraction methods, which are concerned with the recording of refracted waves, and reflection methods, which are concerned with the recording of reflected waves. In both these methods one may measure either the time interval between the generation of the impulse and its arrival at the detectors and also the distance from detectors to shot point or the time intervals between arrivals from detector to detector and also the spacing between detectors. Using the former type of measurement with refraction shooting gives information concerning the velocities in the ground from which inferences may be drawn as to the minerals present, whereas with reflection shooting, a velocity being assumed the depth to the reflecting layer may be computed. Using the latter type of measurement, namely time intervals between arrival at detectors with known separation, one finds the dip of the wave front arriving at the detectors. Under certain conditions, this dip of the wave front gives the dip of the reflecting layer if the velocities in the ground above the reflecting layer are known.

The present invention is concerned with a new electrical method of measuring the orientation or dip of the seismic wave front arriving at the detectors as will be apparent from the following description taken with reference to the attached drawings, wherein:

Fig. 1 is a diagrammatical representation of an arrangement of the apparatus used for determining one component of the dip of the arriving wave front.

Fig. 2 is a diagram showing electrical impulses of various wave shapes as transmitted by detectors to the galvanometers.

Fig. 5 is a diagram showing a plane wave front approaching a line of instruments with geometrical constructions to aid in clarifying the derivation of Formula I below.

Figure 6 is a diagram showing a conventional T-section resistor by means of which the crossing of energy between the circuits connecting the various galvanometers and detectors may be reduced to a negligible value.

Figure 3:
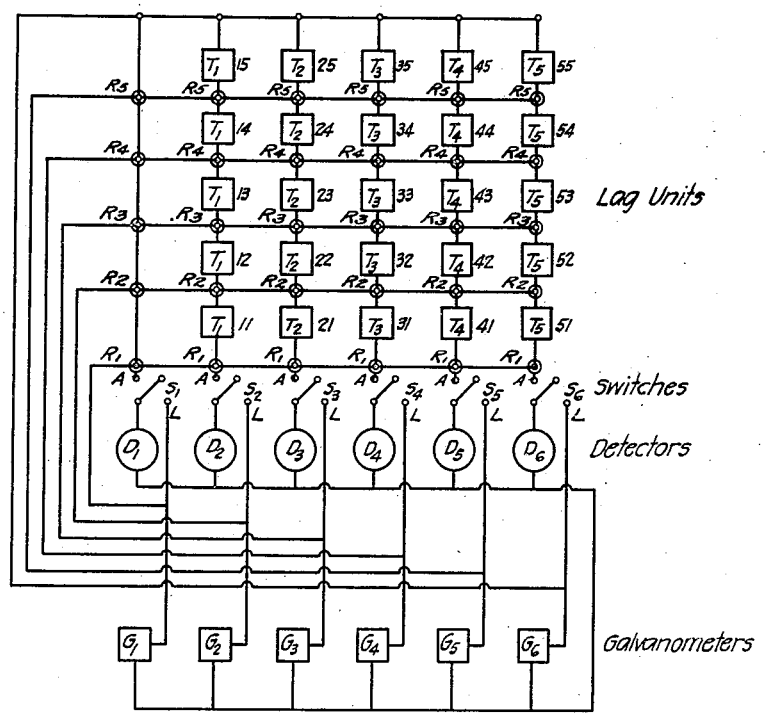
Fig. 3 is a diagram showing the particular arrangement of detectors, galvanometers and lag units to be used according to the method of this invention.

Referring to Figure 1, elastic waves are generated in the earth by detonating an explosive charge at a shot point 10. This charge may consist of any suitable detonating material, such as dynamite, nitro-glycerin, etc., in quantities depending on the nature of the ground being explored and the distances used between the different stations. At points 1, 2, 3, 4, 5, and 6 electrical detectors are buried in the ground. Although six detectors are shown on the drawings, it is clear that their number as well as their spacing from the shot point and from each other depends on the particular problem and the local conditions. Two, eight, twelve and more detectors may be used, located at distances from a few hundred feet to several miles from the shot point, and from less than 100 feet to 2000 feet from each other. These electrical detectors, such as seismometers or geophones may be of any desired construction, such as the moving coil type, the carbon button type or the piezo-electric type, and may have an own frequency of any desired number of cycles per second. The effect of the sound wave in air may be eliminated by burying the detectors at shallow depths in the ground. The elastic waves generated near the surface of the earth by the explosion of the charge 10 reach a reflecting layer 20, and are reflected upwards towards detectors 1-6, where they are converted into electrical currents and transmitted through lines 11, 12, 13, 14, 15, wave-filter units 21 (adapted to eliminate undesirable disturbances, such as the so-called ground roll, the micro-seismic unrest, etc.) and through compensating lag units 22, whose purpose and construction will be described later, to an amplifier unit 23, where the weak electrical currents are amplified by vacuum-tube amplifier circuits employing any suitable number of stages. The amplified impulses are then recorded in a desired manner on a seismogram, for example, by means of an oscillograph or a multi-string galvanometer 24 and a recording camera 25.

Several arrangements are possible in connecting the electrical detectors to the galvanometer strings. In one method, each detector is connected to a separate galvanometer string, and a simultaneous photographic record is made of the motions of the strings so that the time differences in the arrival of the elastic wave to the several detectors may be read on the record.

It is, however, the purpose of this invention to provide an amplitude summation method whereby the outputs of all the detectors are added to each other before being applied to a galvanometer string, so that the record obtained from a shot shows only variations in this sum. Usually the ground wave generated by the explosion will not arrive at all the detectors at the same time, and electrical impulses arriving to the galvanometer from the detectors will therefore not be in phase. The image of the summation impulse recorded on the seismogram will therefore not have the maximum possible amplitude, but will be somewhat flattened along the horizontal axis. This is illustrated in Fig. 2 wherein A represents the seismogram of an impulse received from a single detector, and B represents the seismogram of the sum of four such impulses received from four detectors whose outputs had been added together, or superimposed on each other, said detectors lagging behind each other by a quarter of a cycle. If, however, artificial time lags are introduced in the circuit of each detector, and the value of these artificial time lags in selected so as to compensate for the time differences in the arrival of the ground disturbance to the detectors, the electrical impulses will arrive to the galvanometer in phase, and their summation image on the seismogram will have in that case a maximum amplitude, as shown at C in Fig. 2.

In the case of the arrival of a wave front at a series of detectors 1-6, equally spaced on a straight line, it will be evident from Figure 5 that the following equation holds true, $$T = \frac{s}{v} \sin \theta$$

or $$\sin \theta = T \frac{v}{s} \qquad \text{Formula A}$$

Where $\theta$ = the angle between the intersection of the sensibly plane wave front with the horizontal plane containing the line of detectors.
$T$ = the time lag from detector to detector which brings outputs of the detector into phase.
$v$ = the velocity of the wave front in the earth at the surface.
$s$ = the equal spacing between detectors.

It will be apparent that detectors need not be equally spaced. Then Formula A will apply to only two detectors at a time and will contain different values of "T" and "s" for each pair of detectors.

In a still more general arrangement, the detectors would not all be on the same straight line. Here, also, Formula A above would apply to each pair of detectors, but for different pairs $\theta$ would differ as well as "s" and "T". An arrangement of instruments on two lines at right angles will give two rectangular components of the true dip of the arriving wave front from which the true dip can be found.

For the sake of clearness, only the simple case of detectors equally spaced on a single line will be considered here, although it should be understood that the method of this invention is in no way limited thereto. Since the spacing between detectors and velocity of propagation of the wave front in the surface layers of the ground for a given area are known, the angle $\theta$ which may be called the dip component of the wave front along the line of detectors may be found according to the present method by providing artificial compensating time lags between the detectors and the points at which the current outputs of these detectors are added prior to being recorded by the galvanometer. These time lags would vary from detector to detector by the same amount since detectors are assumed to be spaced equidistantly and the value of this time lag difference which most nearly compensates the time difference in arrival of the wave front will be recognized by the fact that it will give the maximum summation trace on the record made by the galvanometer. This is the "T" of Formula A. This will be made clear by the following example:

In an area where the velocity of propagation of an elastic wave in the ground is 6000 feet per second, four detectors are placed 100 feet apart on a spread of 300 feet, their outputs being all connected to the same galvanometer. If the time of arrival of the ground disturbance to each successive detector is less by 0.00145 second than to the previous detector and we provide an artificial electrical compensating lag of 0.00145 second in the circuit of the second detector, a lag of 0.0029 second in the circuit of the third detector, and a lag of 0.00435 second in the circuit of the fourth detector, the differences in the time of arrival of the ground disturbance to the detectors will be completely compensated for, and the electrical impulses from these detectors will arrive to the galvanometer in phase. This will be shown by the fact that the amplitude of the summation image of the impulses on the seismogram will have in that case a maximum value. Therefore, by taking the value of the compensating lag with which a summation image of maximum amplitude was obtained, (in the present example, 0.00145 second), and by substituting it in the above equation, the dip component of the wave front and therefore, the dip of the reflecting layer may be found as follows:

$$\sin \theta = (0.00145)\frac{(6000)}{(100)} = 0.087$$

$$\theta = 5°$$

Similarly, if in another part of the area the correct compensating lag from detector to detector is found to be 0.0058 second, the dip component of the wave front will be $$\sin \theta_2 = (0.0058)\frac{(6000)}{(100)} = 0.348$$

$$\theta_2 = 20°$$

Since, however, by connecting the detectors to only one galvanometer, it would be necessary to explode many charges before finding the correct value of the compensating lag, this invention provides a system in which a plurality of galvanometer strings are used in combination with a series of detectors, which makes it possible to determine the dip component of the wave front by firing a single shot. The outputs of all detectors are connected to each galvanometer, forming what shall be called here a galvanometer chain. In each galvanometer chain a compensating lag of a different value is used from detector to detector. By recording simultaneously on a seismogram the images of the summation impulses transmitted to each galvanometer, it is possible to determine at once the galvanometer chain in which the most nearly correct lag was used, since the summation trace of that galvanometer will show an impulse image having a maximum amplitude.

A preferred arrangement of apparatus to be used for this purpose in the case of detectors equally spaced on a line is schematically shown in Fig. 3. Six detectors are represented by $D_1$, $D_2$, $D_3$, $D_4$, $D_5$, and $D_6$. The outputs of all these detectors are connected, through the usual filtering and amplifying devices, not shown on the diagram, to each of the six galvanometers represented by $G_1$, $G_2$, $G_3$, $G_4$, $G_5$, and $G_6$. Galvanometer $G_1$ and the six detectors form galvanometer chain No. 1; galvanometer $G_2$ and the six detectors form galvanometer chain No. 2; galvanometer $G_3$ and the six detectors form galvanometer chain No. 3; etc. Compensating electrical lag units are shown at $T_1$, $T_2$, $T_3$, $T_4$, and $T_5$. Each of the compensators $T_1$ (11, 12, 13, 14, and 15) comprises one such lag unit, each of the compensators $T_2$ (21, 22, 23, 24, and 25) two such units, each of the compensators $T_3$ (31, 32, 33, 34, and 35) three such units, each of the compensators $T_4$ (41, 42, 43, 44, and 45) four such units and each of the compensators $T_5$ (51, 52, 53, 54, and 55) five such units. $S_1$, $S_2$, $S_3$, $S_4$, $S_5$, and $S_6$ are switches. When all these switches are in the lower position L, the lag units are cut out of the system, and each galvanometer produces only the record of the corresponding detector, which arrangement may be used, for example, for measuring time differences by displacement along the record.

However, when all these switches are thrown in the upper position A, it will be seen that, in galvanometer chain No. 1, all the detectors will be connected to galvanometer $G_1$ without any compensating lags. In galvanometer chain No. 2 galvanometer $G_2$ will be connected to detector $D_1$ without any compensating lag, to detector $D_2$ with one lag unit (compensator 11) to detector $D_3$ with two lag units (compensator 21), to detector $D_4$ with three lag units (compensator 31), to detector $D_5$ with four lag units (compensator 41) and to detector $D_6$ with five lag units (compensator 51). In galvanometer chain No. 3, galvanometer $G_3$ will be connected to detector $D_1$ without any compensating time lag, to detector $D_2$ with two lag units (compensators 11 and 12); to detector $D_3$ with four lag units (compensators 21 and 22); to detector $D_4$ with six lag units (compensators 31 and 32), etc. In galvanometer chain No. 4, galvanometer $G_4$ will be connected to detector $D_1$ without any compensating time lag, to detector $D_2$ with three lag units (compensators 11, 12, and 13) the number of these lag units increasing in chain No. 4 by three for each succeeding detector. In Chains No. 5 and 6, the galvanometers $G_5$ and $G_6$ will be connected to the first detector without any compensating lag, and to the following detectors with a number of compensating lag units increasing respectively by 4 and 5 lag units for each succeeding detector. This arrangement is fully shown in the following table:

Table I

| Galvanometer chain No. | Number of lag units used in the circuits of detectors | | | | | |
|---|---|---|---|---|---|---|
| | $D_1$ | $D_2$ | $D_3$ | $D_4$ | $D_5$ | $D_6$ |
| 1 | 0 | 0 | 0 | 0 | 0 | 0 |
| 2 | 0 | 1 | 2 | 3 | 4 | 5 |
| 3 | 0 | 2 | 4 | 6 | 8 | 10 |
| 4 | 0 | 3 | 6 | 9 | 12 | 15 |
| 5 | 0 | 4 | 8 | 12 | 16 | 20 |
| 6 | 0 | 5 | 10 | 15 | 20 | 25 |

Suitable resistors may be inserted in the several circuits in order to insure that every galvanometer receives the same fraction of voltage from every detector, and that only a negligible amount of mixing or crossing of energy should occur from one line into another at the points where the lines are interconnected and that the compensators are properly terminated.

These resistors are indicated in Figure 3 as $R_1$, $R_2$, $R_3$, $R_4$, and $R_5$, and comprise each two equal resistances $r_1$ and $r_2$ and a third resistance D, as shown in detail in Fig. 6, illustrating a resistor $R_1$, connected in the chain of detector $D_2$. This type of resistor is well known to the art as a T-connection or junction (see Everitt "Communication Engineering", McGraw-Hill, 1932, page 29, and McElroy "Designing Resistive Attenuating Networks", Proceedings of the Institute of Radio Engineers, vol. 23, No. 3, page 216). All resistors in the same galvanometer chain (for example, all resistors marked $R_1$) are alike. Resistors belonging to a different galvanometer chain (for example, resistors marked $R_2$) have resistances $r_1$ and $r_2$, and resistances $d$ of values different from those of resistors $R_1$ in order that the same fraction of the original current coming from the detector may be fed into the galvanometer chains.

The effect of the resistors $R_1$, $R_2$, $R_3$, $R_4$, $R_5$ in preventing a crossing or mixing of energy such as would occur due to short-circuiting at points where the lines containing the detectors and the galvanometers are interconnected is as follows:

When all the switches S are thrown to the A position, the voltage generated in any detector such as $D_2$, causes a current to flow (Fig. 6) into the resistor $R_1$ which is in line with this detector. Within this resistor the current is divided according to Kirchoff's Law. A certain fraction of it flows through resistances $r_2$ and $d$ (Fig. 6) to the galvanometer chain feeding $G_1$ while another fraction of it flows through resistances $r_2$ and $r_1$ to compensator $T_1$ (11), where it is subjected to a phase shift causing a time lag, and then further to the next resistor $R_2$. Here it is again divided in the same manner, and a certain fraction of it is fed into the galvanometer chain $G_2$, while another fraction flows on through the compensator $T_1$ (12) to resistor $R_3$. This process continues through all of the resistors and compensators in the column of apparatus above detector $D_2$ (which may be called a detector chain), until the last fraction of the current from $D_2$ is fed into the last galvanometer chain feeding $G_6$. It is obvious that the current/splitting process described with regard to detector chain $D_2$ holds true for all the other detector chains, except that in detector chain $D_1$ the current is not subjected to phase shifting, since this chain contains no compensators.

Taking the example of resistor $R_1$ located above detector $D_2$, it may be noted from Fig. 6 that the fraction of the current which flows through resistances $r_2$ and $d$ will again divide according to Kirchoff's Law, one subfraction flowing to the left to galvanometer $G_1$ while another subfraction flows to the right and tends to branch off into each of the five other succeeding detector chains. Since, however, the galvanometer resistance is low compared to the resistance of the lag lines or of the detectors, the subfraction of current which flows to the right and mixes into each of the other detector chains will be very small as compared to that which flows to the left to the galvanometer $G_1$. Thus, in the discussion of the electrical current constants given at the end of this specification the value of the surge impedance of the lag lines, which is equal to the terminal impedance of the detectors, is of the order of 1500 ohms. Since the resistance of the galvanometers used is generally only about 20 ohms, it will be seen that only a negligible portion of the current is diverted at each of the resistors into other detector chains.

From Table I it is clear that in galvanometer string No. 1 the impulses generated by the explosion and picked up by all six detectors are transmitted to galvanometer $G_1$ without any lags. In string No. 2, galvanometer $G_2$ will still receive the sum of the impulses of all six detectors, but the impulse transmitted by each detector will lag behind that of the preceding one by one lag unit, in string No. 3 by two lag units, in string No. 4 by three lag units, in string No. 5 by four lag units and in string No. 6 by five lag units. The six galvanometers are arranged so that a simultaneous and separate photographic record of each galvanometer can be made on a seismogram. Taking the example of a locality where a disturbance travels in the ground with a velocity of 6000 feet per second mentioned above where the detectors are located 100 feet apart, and an electrical compensating lag of 0.00145 second had been selected as a unit, suppose that a swing of maximum amplitude is recorded on the summation trace of galvanometer $G_4$. This indicates that in galvanometer chain No. 4 an electrical lag most nearly approaching the correct value had been used to compensate for the natural lag of arrival of the disturbance to the various detectors. By referring to Table I, it may be seen that in chain No. 4 the electrical lag from detector to detector was equal to three units, that is to 0.00435 second. By substituting this value in the equation given above, the dip component of the wave front is at once found to be approximately equal to 15°, provided the dip is downwards from detector $D_6$ to detector $D_1$. If the dip is in the opposite direction, the same results will be obtained by reversing the connections, i. e. connecting the greatest compensating lag in the circuit of detector $D_1$ instead of detector $D_6$, in a manner which is apparent to anyone skilled in dealing with electrical circuits and is therefore not shown in Fig. 3.

It should be pointed out that the method of this invention has an advantage over the method of connecting each detector to a separate galvanometer and making a separate record of the occurrence at each detector. Where this latter is done, random disturbances arriving at the detector are often of sufficient magnitude to mask the arrival of a particular wave front that is of interest. With the method of this invention the random disturbances will not show up to the same damaging extent. This is because the irregular phase difference for these disturbances from detector to detector will, in general, prevent their being brought into phase by any equal or regularly arranged phase shift between detectors, whereas the main wave front being very nearly plane may have its contributions to the several detectors added in phase by an equal or regularly arranged lag from detector to detector. This last mentioned advantage of the method of this invention suggests the use of this method in cases where we are primarily interested in the orientation of the arriving wave front simply to facilitate obtaining a seismogram of reflected energy relatively free from random disturbances.

If necessary, groups of two or more detectors may replace each detector shown on Fig. 3. These detectors may be connected in series or parallel and will still further reduce the amount of random disturbances arriving at each galvanometer string and also the probability of fake reflections.

Irregularities due to the upper low velocity surface layer may be corrected for by means of an adjustable number of extra lag units in the output of each detector to introduce additional lags in the circuits of the instruments that are at the positions of higher velocity. Information obtained from a preliminary "correction shot" may be used to determine the amount of adjustment necessary in such areas.

Figure 4:
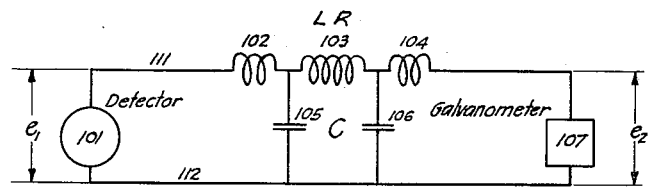
Fig. 4 is a diagram showing the construction of one such lag unit.

With regard to the actual electrical network to be used in applying the method of this invention, compensating time lags of desired values may be introduced into the circuits of the several detectors by using artificial compensators or lag lines of the type diagrammatically shown in Fig. 4, wherein a detector 101 is connected by lines 111 and 112 to a galvanometer 107. Inductive coils 102, 103, and 104, having a resistance R and an inductive reactance L, and condensers 105 and 106, having a condensive reactance C are connected between the detector 101 and the galvanometer. The number and the electrical characteristics of such coils and such condensers may be varied at will. The output voltage of detector 101 and the input voltage at galvanometer 107 are respectively indicated as $e_1$ and $e_2$.

It is clear that by properly selecting the values of the inductive reactance L and of the condensive reactance C of the lag line, the voltage $e_2$ can be made to lag behind the voltage $e_1$ by any desired phase angle $\phi$ or, in other words, be given a time lag T, which may be shown to satisfy the equation $$T = \sqrt{LC}$$

The values of resistance, inductive reactance and condensive reactance must preferably be selected so as to make the time lag independent of the frequency within the range of frequencies for which the filtering and the amplifying systems of the line are designed, since a time lag must be given to a transient impulse.

Moreover, no energy or substantially no energy must be reflected at the terminals of the lag line at these frequencies, since any reflected energy decreases the voltage amplitude available at the output. For this reason, the impedance $Z_T$ at each terminal should be preferably made equal to the surge impedance $Z_S$ of the line. The values of the inductive reactance L and of the condensive reactance C should therefore be selected so as to satisfy the equation $$Z_s = \sqrt{\frac{L}{C}}$$

since the surge impedance of the lag line may thereby be made independent of the frequency.

The attenuation constant of the line should also be independent of the frequency and should be small in order that the amplitude of the output voltage $e_2$ should come as near as possible to the amplitude of the input voltage $e_1$. The range of frequencies within which this method may be used should be made as wide as possible, to make it operative under practically any conditions. In general, it may be shown that the smaller the ratio of the resistance of the lag line to its inductive reactance $$\frac{(R)}{(L)}$$

the further the usable range extends on the low frequency side, while the smaller the time lag $$(\sqrt{LC})$$

the further the usable range extends on the high frequency side. Time lag units should therefore preferably be made as small as possible, and a greater number of them used if a large time lag is necessary.

By way of example, a lag line unit satisfying the above conditions will now be described. Assuming that a time lag $$T = \sqrt{LC}$$

of .0005 second is desired, a ratio of resistance to inductive reactance $$\frac{(R)}{(L)}$$

equal to 10 will give such unit a relatively wide range of usable frequencies. A suitable value for terminal impedances is 1500 ohms. The surge impedance of the line $$Z_s = \sqrt{\frac{L}{C}}$$

must therefore also be equal to 1500 ohms. From the two equations $$\sqrt{LC} = .0005$$

and $$\sqrt{\frac{L}{C}} = 1500$$

it follows that L must equal 0.75 henry and C must equal 0.333 microfarad.

With these constants, it will be found that the lag unit will give a time lag of .0005 second to within one per cent to all frequencies between 6 cycles and 150 cycles, while a frequency of 250 cycles will be lagging by 0.000513 second, and frequencies of 500 cycles and of 2 cycles will be lagging by .00055 second.

The ratio of the input voltage $e_1$ to the output voltage $e_2$ for this lag unit, due to attenuation, will be 0.975 to within one per cent for all frequencies between 6 and 100 cycles, while for a frequency of 400 cycles it will be 0.972 and for 2 cycles it will be 0.978.

Not more than 1% of the voltage amplitude will be reflected at the terminal 107 for frequencies between 6 and 100 cycles per second, while 2.5% will be reflected for frequencies of 200 cycles, and about 10% for frequencies of 400 cycles and of 2 cycles. This reflected part of the voltage amplitude travels back to the input end 101, where the same percentage of it is again reflected to the output end.

Thus, in case of a frequency of 200 cycles per second, due to attenuation, 97.5% of the input voltage $e_1$ of the lag unit will reach the output end, where 97.5% of that value will be available, while 2.5% will be reflected back. This will be reflected again at the input terminal so that after a time delay of about 0.001 second approximately 0.06% of the original voltage will again arrive to the output terminal. This secondary arrival of 0.06% of the original voltage amplitude is entirely negligible, the net result being that 95% of the original voltage amplitude is at once available at the output. For frequencies between 6 and 100 cycles per second, approximately 97% will be available.

In applying the method of this invention for seismic surveying, a suitable number of lag line units of the type described above may be connected between the several detectors and the several galvanometers, according to the manner shown on Fig. 3, so that any desired compensating time lag may be given to the electrical impulses generated by these detectors at the moment when they are reached by a ground disturbance caused by an explosion. It is of course understood that the usual filtering and amplifying devices, as well as the necessary means for recording impulses on seismograms, are to be used in connection with the apparatus described hereinabove.

I claim as my invention:
1. In a seismic surveying system comprising a plurality of detectors electrically connected to a plurality of galvanometers, the steps of generating a disturbance in the ground, converting said disturbance into electrical impulses at each of the detectors, transmitting the impulses from all detectors to each of the galvanometers through lines having different electrical time lags for each galvanometer, and simultaneously recording the indications of all galvanometers.

2. In a seismic surveying system comprising a plurality of detectors and a plurality of galvanometers, each of said galvanometers being electrically connected to all of said detectors by lines provided with suitable electrical time lag units, whereby the first galvanometer is connected to all the detectors, with zero time lag, and the first detector is connected to all galvanometers through lines having a zero time lag, the second galvanometer is connected to the second detector through a line having one time lag unit, and to each following detector through a line having one time lag unit more than the preceding detector; and each following galvanometer is connected to all the detectors in a similar manner whereby the number of time lag units in the line connecting a detector with each successive galvanometer is greater than the number of time lag units in the line connecting the same detector to the preceding galvanometer, the steps of generating a disturbance in the ground, converting said disturbance into electrical impulses at each of the detectors, transmitting the impulses from all detectors through said lag lines, superimposing the impulses from all detectors and applying them to each galvanometer, and simultaneously recording the indications of all galvanometers.

3. Seismic surveying apparatus comprising means to generate a disturbance in the ground, means to convert said disturbance into electrical impulses at a plurality of suitably spaced detectors, a plurality of galvanometers, means for superimposing and applying the impulses from all detectors on each galvanometer, said means comprising lines electrically connecting said detectors to said galvanometers and provided with suitable electrical time lag units, whereby the first galvanometer is connected to all detectors, and the first detector is connected to all galvanometers through lines having a zero time lag, the second galvanometer is connected to the second detector through a line having one time lag unit, and to each following detector through a line having one time lag unit more than that of the preceding detector; and each following galvanometer is connected to the detectors in the manner stated for the second galvanometer, the number of time lag units in the line connecting a detector with each successive galvanometer being greater than the number of time lag units in the line connecting the same detector to the preceding galvanometer, and means for simultaneously recording the indications of the galvanometers.

4. In the apparatus of claim 8, lines to transmit electrical impulses from the detectors to the galvanometers, having values of resistance, inductive reactance and condensive reactance selected so that the surge impedance of each line is approximately equal to the impedance at either of its terminals.

5. In the apparatus of claim 8, lines to transmit electrical impulses from the detectors to the galvanometers, having values of inductive reactance and condensive reactance selected so that the surge impedance of the line is approximately equal to the square root of the line's inductance divided by its capacitance.

6. In a seismic method for determining the dip of a subterranean reflecting layer, employing a plurality of suitably spaced detectors and a plurality of galvanometers electrically connected thereto, the steps of successively converting a reflected elastic wave generated by a disturbance in the ground into electrical impulses at each of the detectors, transmitting the impulses from all detectors to each galvanometer through lines provided with a plurality of time lag compensators, the time lag caused by each compensator being of different value in lines connecting each detector with the different galvanometers, and the number of said compensators in each line between a detector and a galvanometer being inversely proportional to the distance between said detector and the first detector to be reached by the reflected wave, applying the superimposed impulses from all detectors to each galvanometer and simultaneously recording the indications of all galvanometers.

7. In a seismic apparatus for determining the dip of a subterranean reflecting layer, the combination of means adapted to generate a disturbance in the ground, a plurality of suitably spaced detectors adapted to convert said disturbance into electric impulses, a plurality of galvanometers, means for superimposing and applying the impulses from all detectors to each galvanometer, said means comprising lines electrically connecting the detectors to the galvanometers, and provided with time lag compensators whereby the first detector is connected to all galvanometers, and the first galvanometer is connected to all detectors by lines having a zero time lag; the second detector is connected to the second galvanometer through a line having one compensator, and to each following galvanometer through a line having one compensator more than the line to the preceding galvanometer; and each of the following detectors is connected to the galvanometers in the manner recited with regard to the second detector, each of the compensators connected to said following detectors being adapted to impose on electric impulses a greater time lag than each of the compensators connected to the preceding detectors, and means for simultaneously recording the indications of the galvanometers.

8. In a seismic apparatus for determining the dip of a subterranean reflecting layer, the combination of means adapted to generate a disturbance in the ground, a plurality of suitably spaced detectors adapted to convert said disturbance into electric impulses, a plurality of galvanometers, means for superimposing and applying the impulses from all detectors to each galvanometer, said means comprising lines electrically connecting the detectors to the galvanometers and provided with compensators comprising lag units adapted to impose a time lag on electric impulses passing therethrough, the first detector being connected to all galvanometers, and the first galvanometer being connected to all detectors by lines having a zero time lag; the second detector being connected to the second galvanometer through a line having one compensator, and to each following galvanometer through a line having one compensator more than the line to the preceding detector; and each of the following detectors being connected to the galvanometers in the manner recited with regard to the second detector, each of the compensators connected to said following detectors comprising a greater number of time lag units than the compensators connected to the preceding galvanometers, and means for simultaneously recording the indications of the galvanometers.

9. In the combination of claim 8 electrical time lag units having values of inductive reactance and conductive reactance selected so that the time lag in seconds given by the unit to a transient electrical impulse is approximately equal to the square root of the product of the unit's inductance and its capacitance.

DAVID SAVILLE MUZZEY, Jr.